June 5, 1956     O. H. BANKER     2,748,912
SPRAG MECHANISMS
Filed May 12, 1951     2 Sheets-Sheet 1
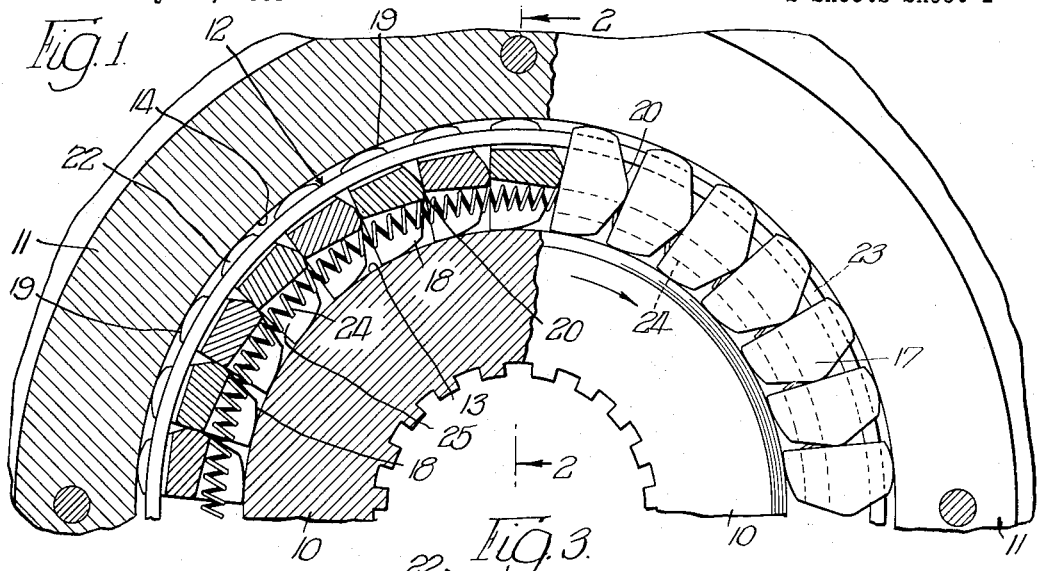
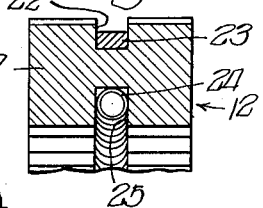
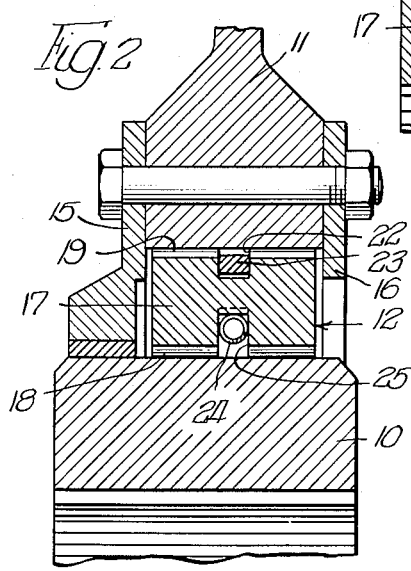
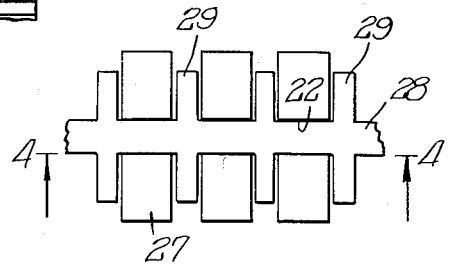
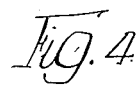
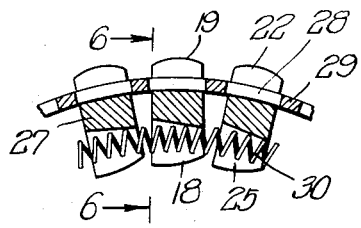
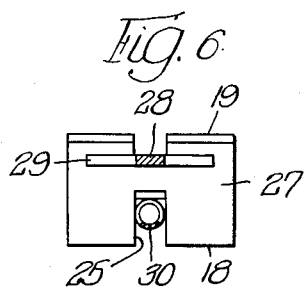
INVENTOR.
Oscar H. Banker,
BY
Cromwell, Greist & Warden
Attys.

June 5, 1956 — O. H. BANKER — 2,748,912
SPRAG MECHANISMS
Filed May 12, 1951 — 2 Sheets-Sheet 2
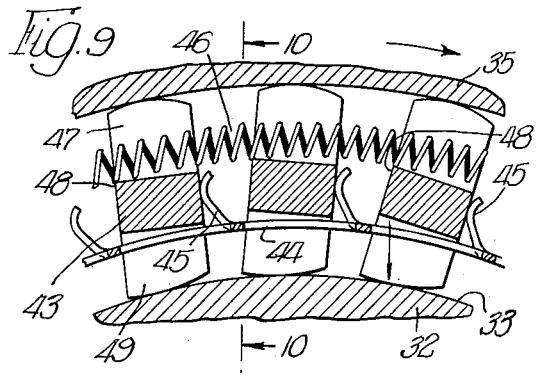
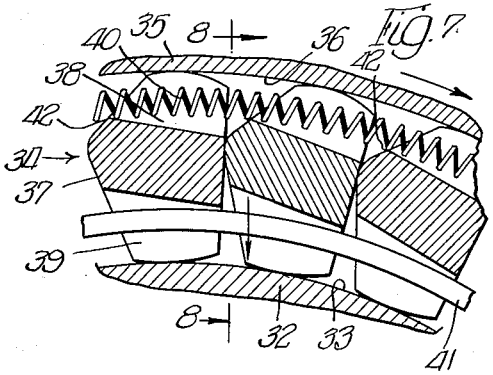
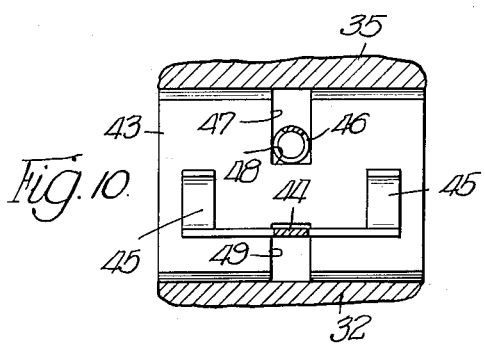
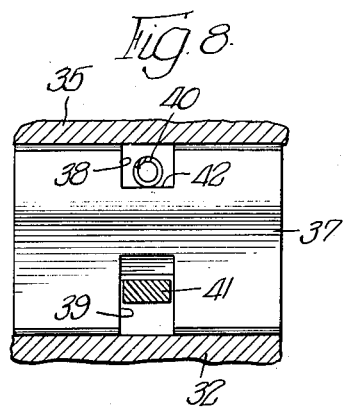
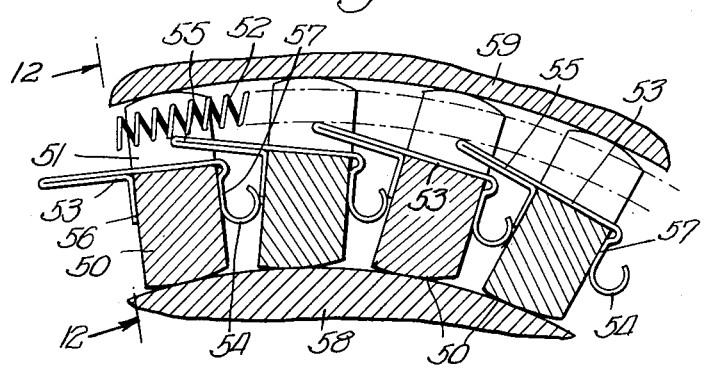
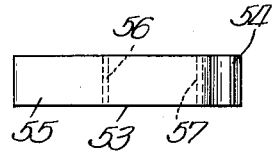
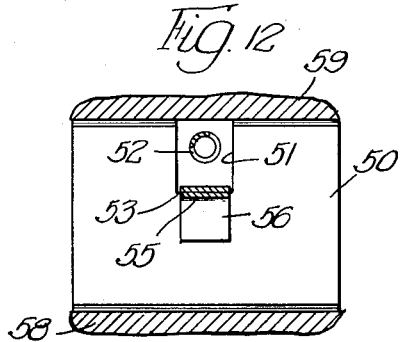
INVENTOR.
Oscar H. Banker,
BY Cromwell, Grist & Warden
Attys.

United States Patent Office 2,748,912
Patented June 5, 1956

2,748,912

SPRAG MECHANISMS

Oscar H. Banker, Evanston, Ill., assignor to New Products Corporation, Chicago, Ill., a corporation of Delaware Application May 12, 1951, Serial No. 226,075

24 Claims. (Cl. 192—45.1)

The present invention relates to improvements in a sprag mechanism of the type commonly employed in overrunning clutches, torque converters, automatic transmissions, and like installations in the automotive industry and related fields.

It is a general object of the invention to provide an improved sprag unit, particularly well adapted for use as a clutch or torque converter component, which has improved provisions to increase the ease of installing the same in operating relation to a pair of clutch race members or corresponding relatively rotatable, usually concentric, parts, by enabling individual loose sprag elements of the unit to be held in a predetermined, annularly and radially spaced relation prior to assembly, thus eliminating the possibility of mis-assembly of the sprag elements in an up-side-down position, as sometimes occurs unless the mechanic is very careful.

Another and more specific object of the invention is to provide a sprag unit or mechanism characterized by a plurality of hardened metal sprag elements arranged in annular succession between a pair of clutch race or torque converter members, and by improved ring and spring retainer means whereby these sprag elements are maintained as a unitary assembly in proper circumferential arrangement prior to installation, yet are spring urged immediately to proper locking relation to the members aforesaid when the direction of torque is reversed in operation.

A still further specific object is to provide a unitary sprag mechanism in which the retaining ring referred to is in a free, floating relation to the sprag elements in the installed condition of the unit, the spring acting alone to urge the elements toward locking position.

Another and more general object of the invention is to provide a sprag mechanism fabricated in its entirety of rigid metal parts including a plurality of shaped, hardened steel sprag elements, together with a retaining ring and an energizing spring adapting the elements for quick and easy installation, without possibility of wrong placement of the sprags, and for equally ready removal and replacement, as for inspection or repair.

Another object of the invention, in any of its adaptations to a torque converter, to an overrunning clutch, or to a related installation, is to provide a sprag mechanism acting to counteract an existing tendency, usually due to the effect of centrifugal force, for the sprag elements to become wedged, sticky or erratic in operation, hence not in condition to cause instantaneous stoppage of the torque converter reaction member when the direction of fluid flow is reversed, or to lock the relatively rotatable driving and driven members of another type installation.

Yet another object of the invention is to provide a torque converter embodying a sprag unit or mechanism of the sort referred to in the preceding paragraph which also embodies improved mechanical provisions to maintain its individual, otherwise loose sprag elements in a predetermined annular series prior to installation, these provisions, in certain of the illustrated embodiments, involving use of an energizing spring which maintains the sprag elements in condition for instantaneous resumption of locking action on the reversal of the reaction element, together with a retaining or assembly ring against which the sprag elements are held by the spring prior to installation, the ring being in loose, floating relation to the sprags when installed.

A further specific object of the invention is to provide a sprag mechanism including an energizing spring and a series of hardened steel sprag elements as described, in which the means to hold these elements in assembly and in circumferentially spaced relation to one another takes the form of a single assembly ring having integral spacer lugs intervening between successive sprag elements.

A still further specific object is to provide an improved sprag assembly including a series circumferentially arranged sprags, an annular spring adapted to urge the same to predetermined relation to a pair of associated clutch or torque converter parts, and a number of individual clip elements adapted to be readily applied to the sprags, which clips have formations thereon for the purpose of maintaining the sprags and spring in unitary relation, both when installed and not installed with the torque parts, and present portions for engagement and energization by the spring, thereby to maintain the sprags in a desired relation to the fixed and rotatable parts.

It is a general object of the invention to provide an improved sprag unit for a torque converter or the like which includes sprag elements arranged in the manner described, and spring means acting on these elements to maintain the same in fixed relation to the stationary member of the torque converter or to the slower speed element of another installation.

The foregoing statements are indicative in a general way of the nature of the invention. Other and more specific objects will be apparent to those skilled in the art upon a full understanding of the construction and operation of the device.

Several embodiments of the invention are presented herein for the purpose of illustration. It will be appreciated that the invention may be incorporated in other modified forms coming equally within the scope of the appended claims.

In the drawings:

Fig. 1 is a fragmentary view partially broken away and in transverse vertical section through the improved sprag unit or mechanism and associated inner and outer races of a well known type of overrunning clutch;

Fig. 2 is a fragmentary view in section along a line corresponding to line 2—2 of Fig. 1, further illustrating the components of the improved sprag unit and the relationship thereof to the clutch races;

Fig. 3 is a fragmentary view in section similar to that of Fig. 2, illustrating the sprag unit components in their position prior to assembly with the remainder of the clutch, or other instrumentality in which the unit is to be installed;

Fig. 4 is a fragmentary view in vertical transverse section through a sprag unit employing a somewhat different type of sprag element, illustrating the improved provisions according to the invention for holding this unit in assembled condition prior to installation;

Fig. 5 is a fragmentary top plan view of the sprag unit appearing in Fig. 4, further illustrating the details and the positional relationship of the sprag elements and retainer or assembly ring of the unit;

Fig. 6 is a view in transverse vertical section along line 6—6 of Fig. 4;

Fig. 7 is a fragmentary view in transverse vertical section through the improved sprag unit in accordance with an alternative adaptation of the invention featuring the use of form sprags;

Fig. 8 is a fragmentary view in section along line 8—8 of Fig. 7;

Figs. 9 and 10 are fragmentary views similar to Figs. 7 and 8, respectively, illustrating an installation embodying a different type of sprag element, Fig. 10 being a section along line 10—10 of Fig. 9;

Fig. 11 is a fragmentary view in vertical transverse section showing another adaptation of the principles of the present invention, which dispenses with the use of a retaining ring;

Fig. 12 is a view in transverse section along line 12—12 of Fig. 11, further illustrating the modified provisions for holding the sprag elements of the unit in operative relation to one another, as when disassembled, and for resiliently energizing the sprags in improved fashion; and Fig. 13 is a top plan view of one of the individual spacing clips or elements which are associated with sprag elements appearing in Figs. 11 and 12.

As indicated above, the objectives of the present invention are twofold in the broadest sense. One is to provide an improved sprag mechanism or unit of general utility having provision for increasing the ease of handling, installing, removing and replacing the same, with reference to the positioning of its sprag elements relative to coacting parts, for example of a clutch or a unit associated with a torque converter. This is accomplished by the use of a retaining or assembly ring and an energizing spring to maintain the sprags of the unit in proper annular spacing when the latter is disassociated from the parts referred to. The spring holds the sprags to the ring and also acts to insure immediate resumption of clutching or locking action by the sprag elements when in assembled position.

The other general objective of the invention is the provision of an improved installation for a clutch, torque converter or the like employing an improved sprag unit of the sort referred to in an improved relation to the fixed or slow speed member and to the concentric relatively rotatable member of the installation. In this improved relationship, the disturbing effect of overrun of the sprag unit relative to the slow member, in attempting to follow the higher speed member is counteracted. The sprag unit is maintained in fixed relation to the fixed or slow speed part and in a proper angular position to resume locking engagement with the other part instantaneously, when the sprags are called upon to do so.

Figs. 1, 2 and 3 illustrate one embodiment of the improved sprag mechanism in a simple overrunning clutch, employing specially shaped sprag elements known as form sprags. The sprag unit thereof is interchangeably used in other types of mechanisms, as appears from the above. This clutch comprises an inner, engine driven member or race 10, an outer output member or race 11 in concentric relation thereto, and an annular sprag unit or assembly 12 disposed between opposed, concentric clutching surfaces 13, 14 of the inner and outer members 10, 11 respectively. Annular side retainer plates 15, 16 for this unit (Fig. 2) are applied to the outer member 11, one thereof having a bearing on the inner clutch member 10. This general combination is well known.

Sprag unit 12 is illustrated in Fig. 3 in its inoperative or idle condition, prior to installation in operative relation to the clutch members 10 and 11. The installed relationship is shown in Figs. 1 and 2. The unit comprises a plurality of sprag elements 17 of the form sprag type characterized by inner and outer, curvilinear clutching surfaces 18, 19 respectively, and by forward protuberant surfaces, each of which engages the rear flat face of the next succeeding sprag in the manner illustrated in Fig. 1, to maintain the series of sprags in proper circumferential spacing.

As illustrated in Fig. 3, the sprag elements 17 are each provided with an outer retaining ring groove 22 extending in the circumferential direction across the outer curved clutch surface 19 thereof, the groove being located centrally of the opposed parallel side faces of the sprag. Aligned grooves 22 of successive sprag elements receive a peripherally continuous retaining or assembly ring 23 of circular shape, and the sprag elements are urged outwardly against this ring, in the non-installed condition shown in Fig. 3, by means of an annular, compressed garter spring 24. Spring 24 rides in successive aligned, central recesses 25 in inner faces 18 of the sprag elements, which recesses, like recesses 22, extend in the circumferential direction.

The loose sprag elements 17 are maintained in proper circumferential spacing and are also restrained from radial or transverse separation prior to installation between the clutch members 10, 11. The operation of installing the sprag assembly is greatly facilitated by the described arrangement. Under prior practice it was necessary for the separate sprag elements to be thrust individually into place between members 10, 11. This is a very tedious and time consuming operation, as well as objectionable because of the possibility of an assembler inadvertently or carelessly placing the sprags in an up-side-down position.

When sprag unit 12 is operatively mounted between the clutch races 10, 11 the series of sprags is constricted radially against the expansive force of coil garter spring 24. This causes the lower surface of the outer ring groove 22 to move away from the ring 23, the latter thereafter floating freely. Its function is restored when the unit 12 is removed for inspection or repair.

Assuming rotation of the engine driven race 10 in clockwise direction, as indicated by circumferential arrow in Fig. 1, the power output member 11 will rotate correspondingly through the strut-clutching action of the sprag elements. Should the outer member overrun the inner, spring 24 urges the sprag elements 17 as a unit against its inner diameter, in position for immediate transmission of torque to the outer member when the inner member resumes a controlling drive relationship.

The modified embodiment of the invention illustrated in Figs. 4, 5 and 6 employs sprag elements 27 differing from the form sprags 17 of Figs. 1, 2 and 3 in that they have parallel front and rear surfaces, hence require some provision for maintaining proper circumferential spacing thereof. This function is performed by the special retaining or assembly ring 28. The latter has pairs of integral opposed, shaped side arms 29 which intervene between the adjacent surfaces of successive sprags to maintain the spacing referred to. In other respects, the special ring 28 performs the function of acting with garter spring 30 in retaining the sprag elements 27 in annular assembly when the sprag unit is disassociated from the clutch or corresponding members. Spring 30 performs all of the other functions which are performed by the coil spring 24 described in connection with Figs. 1 through 3. As illustrated in Figs. 1 and 4, the sprag grooves 25 are cut at an angle so that the respective outwardly expansive springs 24, 30 engage at the forward upper edge of the groove, tending to tilt the sprags counterclockwise and urge the same in a direction such that they instantly resume locking engagement with peripheral surface 14 when overrun ceases.

Figs. 7 through 13 illustrate further modified forms of unitary sprag assembly embodying the principles described above and, furthermore, mounted in a manner for use with a torque converter. However, these sprag units are of general application to other types of drive assembly, as stated above.

With reference to the particular modification illustrated in Figs. 7 and 8 of the drawings, an inner member 32 whose outer peripheral surface 33 is engaged by the sprag unit 34 will be assumed to be the stationary member of the mechanism. The outer member 35 whose inner periphery 36 is engaged by the sprag unit will be assumed to be the reaction member; it is stationary when torque is being transmitted through the agency of the torque converter, but it rotates in the same direction as the engine when torque is reduced and the converter becomes a coupling.

Unit 34 comprises a circumferential series of form sprag elements 37 which have outer and inner central, circumferentially extending grooves 38, 39 respectively, as described above, the former receiving the contractile, coil garter spring 40, while the latter receive a retaining or assembly ring 41. As in the case of the first two forms, spring 40 bears against the rear lower edge 42 of the groove 38, for a purpose to be described.

Unit 34 retains its sprag elements in proper position when out of assembly with the members 32, 35, as in the forms of Figs. 1 through 6. It has certain other very important advantages which are more readily understood upon consideration of an accepted present day sprag adaptation to a torque converter design, and of its principle of operation, which I believe to be responsible for unsatisfactory operation thereof.

Considerable difficulty is being experienced in the operation of sprag torque converters, and it is commonly attributed to deficiency in capacity or size of the sprag unit of a given installation. However, the present improvements are directed to the correcting of an essentially faulty theory regarding proper arrangement of the sprags and their energizing spring in order to produce locking engagement of the sprags with the associated members. In accordance with accepted designs the energizing spring means are mounted in such relation to the sprags as to exert a force to tip the latter to a locking cam or wedge angle, and at the same time to force the sprags radially against the relatively rotatable overrun or reaction member, hugging the latter snugly. Parenthetically, this would be the outer member in an installation having the relationship of parts which appears in Figs. 7 and 8. This member rotates as high as 4,000 R. P. M., at top motor speed in present day torque converters. The sprags then move as a unit with the rotating member and are subject to extreme centrifugal force. Their center of gravity is already slightly overcenter due to their tipping angle, hence they are caused by centrifugal force to tip well out of line relative to their natural working position. Under spring force, aggravated by the centrifugal effect, they tend to tilt and fly out of contact with the stationary inner member, hence become wedged or sticky and erratic or sluggish in operation at the very time when they are needed to stop reverse rotation of the outer member.

When the operator, after reducing speed, accelerates slightly and boosts torque, the reaction member of the converter, which is to be held stationary by the sprags against the increased torque tending to rotate it backwardly, of course responds immediately to that torque and starts to reverse itself. However the sprags have tipped beyond their normal working position and are not quickly responsive in returning to working position. Accordingly the reaction member actually remains unlocked and rotates backwards for a few revolutions before the sprags straighten out and resume locking action thereon. When they do come into action, at a time when the reaction member is rotating reversely, halting of the latter takes place under such shock that severe damage is often done to the whole mechanism. A corresponding shock, possibly in lesser degree but still objectionable, is experienced in existing sprag type overrunning clutches in which the sprags are urged against the faster clutch race.

In the operation of the installation shown in Figs. 7 and 8, outer reaction member 35 is normally stationary when torque is being transmitted thereby, but rotates in the same direction as the engine when torque is reduced and the converter becomes a coupling. This direction, clockwise, is indicated by circumferential arrow in Fig. 7 and represents the free direction of the reaction member.

When it tends to reverse to the opposite direction it is locked by sprag unit 34, instantaneously and with zero reverse rotation, in stationary engagement with fixed inner member 32. It does this because the constrictive garter spring 40 rides upon the edge 42 of the outer sprag recess 38, tending to tilt and push the sprags down against the fixed member 32, as indicated by radial arrow in Fig. 7. It should be clearly understood that this is in contradiction to the relation in conventional sprag torque converters. In those, a spring tips and urges the sprags against the rotatable member, so that resulting rotation of the sprag unit with that member, coupled with spring action, naturally cause the sprags to tilt and slide out of contact with the fixed torque converter member.

The present unit thus avoids the cause of reversing shock described above, such as is inevitable in the operation of known sprag mechanisms of this sort. No rotating body can change its direction of rotation without first coming to a theoretical standstill. Accordingly, no matter how forcefully outer member 35 is urged to reverse its direction of free rotation; it first retards and comes to a dead stop. Since the sprag elements 37 have maintained fixed relation to stationary member 32, they are in proper position to be tilted instantly by garter spring 40 to a fixed locking relation to the reaction member, when the force on the latter reverses.

It is evident that in any torque converter installation in which the inner member is the high speed or free running member and the outer member is the fixed member, the action of the spring can be reversed to achieve the improved operation described above. This arrangement will be similar to the one illustrated in Fig. 1.

The embodiment of the invention illustrated in Figs. 9 and 10 employs plain parallel-faced sprag elements 43 similar to those of the embodiment of Figs. 4, 5 and 6. A retaining, spacing and assembly ring 44 is illustrated which has pairs of integral, upwardly projecting curved lugs 45 mounted on opposed intermediate arms. These lugs fit in the spaces between successive sprag elements to maintain the latter in proper circumferential array. The coiled, constrictive garter spring 46 acts in the upper recess 47 of the sprag elements to engage a lip or edge 48 of that recess, thereby tending to tilt the sprag in the radial direction indicated by arrow in Fig. 9, as in the form of Figs. 7 and 8. Retaining ring 44 is received in the aligned inner grooves 49 of the sprag elements. Here again, a mere reversal of the direction of action of spring 46, as shown in Fig. 4 will adapt the unit for an installation in which the inner member is the faster of the two.

Figs. 11, 12 and 13 illustrate a still further modified form of torque converter mechanism which dispenses with the retaining and assembly ring of the previously described embodiments, yet without sacrificing its function. Here the sprag elements 50 each have but a single central upper recess 51 receiving the constrictive coil spring 52. Individual spring steel clips 53 are applied to the sprags to hold the same in proper, circumferentially spaced order through the agency of a forward curled spacer lip 54 on each of the clips. The material of the clip is brought rearwardly, then reversed upon itself to form a double thickness tail 55, and the body of the sprag element is frictionally received in and gripped between a terminal, downturned tip 56 of the clip and a forward leg 57 thereof which adjoins spacer lip 54. The spacing between the tip and leg 56, 57 is somewhat less than the front-to-rear thickness of sprag element 50 so that effective spring gripping effort is exerted on the latter. Tail portion 55 receives the tilting action of spring 52, as illustrated in Fig. 10, to fulcrum and urge the sprags against the stationary inner mmeber 58 of the torque converter. They thus take locking engagement with reaction member 59 at the instant that the rotative torque on the latter is reversed, as in the embodiments of the invention illustrated in Figs. 7 through 10.

Though described with particular attention to their adaptability for use in a torque converter, it will be appreciated by those skilled in the art that the adaptations illustrated in Figs. 7 through 13 are also well suited for use in an overrunning clutch or related setting.

It will be perceived that the sprag unit of Figs. 11 through 12 has the same characteristic as the other modification of retaining unitary, self-contained assembly when not associated with coacting members. A shimlike, keystone action of the curled lips 54 of clips 53, due to the operation of spring 52 to crowd the sprag-spacer units radially inwardly into wedged relation against one another, is substituted for the positive restraining ring action of the other forms. The double width tail portions 55 are received in the groove 51 of each succeeding sprag to restrain the sprags of the unit in the lateral direction.

I claim:

1. In a one-way clutch including coaxial radially spaced annular raceways; a series of sprags for insertion between said raceways in cooperative relation thereto, each sprag having a channel extending to a substantial depth in a raceway engaging portion thereof and in a plane perpendicular to the axis of said raceways, and a ring having outer and inner continuous circular peripheral contours, said ring fitting within said channel and forming a mounting for all of a full complement of the sprags with only working clearance therebetween and, which independent of said raceways will hold the axes of the individual sprags parallel to each other.

2. The construction as in claim 1, in which each sprag has a second channel formed in the opposite raceway engaging portion thereof, said ring being engageable with one of said channels.

3. A sprag mechanism comprising a pair of coaxial, relatively rotatable members in spaced relation to one another, a plurality of loose sprag elements disposed in transverse alignment with one another and in circumferential series between and coaxial with said members, spring means engaging said series of elements around a circumferential zone and urging said elements in a direction toward and against one of said members, and retaining means positioned between the side surfaces of said sprag elements and acting to sustain said elements radially in said circumferential series in opposition to said spring means and to prevent displacement of the elements from transverse alignment when separated from said members, said retaining means acting on said series of sprag elements radially oppositely of said spring means in a circumferential zone which is spaced from said first zone.

4. A sprag type torque converter mechanism comprising stationary and rotatable members disposed in concentric, radially spaced relation one within the other, and a sprag assembly disposed in the annular radial space between said members, said assembly comprising a plurality of individual sprag elements arranged in annular series and in transverse alignment with one another, said elements being adapted for wedged engagement between the outer periphery of the inner member and the inner periphery of the outer member, annular spring means engaging said series of elements around a circumferential zone and urging said sprag elements radially toward and against said stationary member, whereby to tend to maintain said sprag assembly in fixed relation to the stationary member upon rotation of said rotatable member, and retainer means positioned between the side surfaces of said sprag elements and coacting with said spring means to hold said sprag elements radially in said annular order and against sidewise displacement from transverse alignment when said sprag assembly is dismounted from said members, said retainer means acting on said series of sprag elements radially oppositely of said spring means and in a circumferential zone which is spaced from said first zone by the material of the elements.

5. A mechanism in accordance with claim 4 in which said retainer means comprises an annular ring acting on said sprag elements to sustain the same against the radial force of said annular spring means in said dismounted condition of the sprag assembly.

6. A mechanism in accordance with claim 4 in which said retainer means comprises a plurality of spacer elements disposed between said respective sprag elements and compressed therebetween by said spring means in said dismounted condition of the sprag assembly.

7. A sprag type torque converter mechanism comprising stationary and rotatable members disposed in concentric, radially spaced relation one within the other, and a sprag assembly disposed in the annular radial space between said members, said assembly comprising a plurality of individual sprag elements arranged in annular series and in transverse alignment with one another, said elements being adapted for wedged engagement between the outer periphery of the inner member and the inner periphery of the outer member, annular spring means engaging said series of sprag elements around a circumferential zone and urging said sprag elements radially toward and against said stationary member, whereby to tend to maintain said sprag assembly in fixed relation to the stationary member upon rotation of said rotatable member, and retainer means positioned between the side surfaces of said sprag elements and coacting with said spring means to hold said sprag elements radially in said annular order and against sidewise displacement from transverse alignment when said sprag assembly is dismounted from said members, said retainer means including a plurality of spacer elements disposed between said respective sprag elements and compressed therebetween by said spring means in said dismounted condition of the sprag assembly, said spacer elements having integral projecting extensions engaged by said spring means to urge said sprag elements radially while tilting the same about individual axes thereof, said retainer means acting on said series of sprag elements radially oppositely of said spring means and in a circumferential zone which is spaced from said first zone.

8. A sprag mechanism comprising a pair of coaxial, relatively rotatable members in spaced relation to one another, a plurality of loose sprag elements disposed in transverse alignment with one another and in circumferential series between and coaxial with said members, spring means engaging said series of elements around a circumferential zone and urging said elements in a direction toward and against one of said members, and retaining means positioned between the side surfaces of said sprag elements and acting to circumferentially space said elements and to sustain the same radially in said circumferential series in opposition to said spring means and to prevent displacement of the elements from transverse alignment when separated from said members, said retaining means acting on said series of sprag elements radially oppositely of said spring means and in a circumferential zone which is spaced from said first zone by the material of the elements.

9. A sprag mechanism comprising a pair of coaxial, relatively rotatable members in spaced relation to one another, a plurality of loose sprag elements, disposed in transverse alignment with one another and in circumferential series between and coaxial with said members, spring means engaging said series of elements around a circumferential zone and urging said elements in a direction toward and against one of said members, and retaining means positioned between the side surfaces of said sprag elements and acting to sustain said elements radially in said circumferential series in opposition to said spring means and to prevent displacement of the elements from transverse alignment when separated from said members, said retaining means acting on said series of sprag elements radially oppositely of said spring means and in a circumferential zone which is spaced from said first zone by the material of the elements.

10. A mechanism in accordance with claim 9 in which said sustaining means comprises a plurality of spacing elements located between successive sprag elements.

11. A mechanism in accordance with claim 9 in which said sustaining means comprises a ring mounted concentrically of said circumferential series and provided with a plurality of integral spacing elements located between successive sprag elements.

12. A sprag mechanism comprising a pair of coaxial, relatively rotatable members in spaced relation to one another, a plurality of loose sprag elements disposed in circumferential series between and coaxial with said members, annular, radially acting spring means engaging said series of elements around a circumferential zone and urging said elements in a direction toward and against one of said members, and retaining means acting to sustain said elements in said circumferential series in opposition to said spring means when separated from said members, said retaining means comprising a ring mounted concentrically of said series and radially supporting said sprag elements from the side thereof opposite that acted on by said annular spring means, said ring acting on said series of sprag elements radially oppositely of said spring means and in a circumferential zone which is spaced from said zone by the material of the elements.

13. A mechanism in accordance with claim 12 in which said retaining ring is in loose floating relation to said sprag elements when the latter are operatively disposed between said relatively rotatable members.

14. A sprag assembly comprising a plurality of loose sprag elements arranged in circumferential series and characterized by inner and outer opposed clutching surfaces, an annular radially acting spring engaging said series around a circumferential zone, and a sprag retaining ring, said sprag elements being provided with circumferentially extending and aligned inner and outer grooves in said inner and outer opposed surfaces when so disposed in series, said spring being disposed in one aligned set of said grooves and acting to urge said sprag elements radially, said ring being disposed in the other set of grooves to sustain said elements in opposition to said spring when said elements are otherwise unrestrained, said ring acting on said series of sprag elements radially oppositely of said spring means and in a circumferntial zone which is spaced from said first zone by the material of the elements.

15. A sprag assembly comprising a plurality of loose sprag elements arranged in circumferential series and characterized by inner and outer opposed clutching surfaces, an annular radially acting spring engaging said series around a circumferential zone, and a sprag retaining ring, said sprag elements being provided with circumferentially extending and aligned inner and outer grooves in said inner and outer opposed surfaces when so disposed in series, said spring being disposed in one aligned set of said grooves and acting to urge said sprag elements radially, said ring being disposed in the other set of grooves to sustain said elements in opposition to said spring when said elements are otherwise unrestrained said ring acting on said series of sprag elements radially oppositely of said spring means and in a circumferential zone which is spaced from said first zone by the material of the elements, said ring having elements positioned between the sprag elements of the series to maintain the same in predetermined circumferential spacing.

16. A sprag unit comprising a plurality of sprags arranged in circumferential series, and a spring disposed concentrically of said series and urging the sprags radially, said sprags each having a wedging surface provided with a groove which extends circumferentially in relation to said series, and clip elements applied to said successive sprags, which elements each having a projecting portion received in the groove of a succeeding sprag and engaged by said spring to transmit radial force to the associated sprag.

17. A sprag unit comprising a plurality of sprags arranged in circumferential series, and a spring disposed concentrically of said series and urging the sprags radially, said sprags each having a wedging surface provided with a groove which extends circumferentially in relation to said series, and clip elements applied to said successive sprags, which elements each having a projecting portion received in the groove of a succeeding sprag and engaged by said spring to transmit radial force to the associated sprag, said clip elements including a portion disposed between successive sprags to maintain the same in predetermined circumferential spacing.

18. A sprag assembly for one-way clutches of the type including spaced concentric raceways on relatively rotatable coaxial members for receiving sprags therebetween; said assembly comprising a series of sprags, each having an outer and an inner race engaging cam face with a circumferentially extending channel therein, a ring on which all of said sprags are mounted engaging one of said channels of each sprag, and a resilient annulus completely surrounding said series of sprags engaging the other channel of each sprag and retaining the same on said ring.

19. The construction as in claim 18 in which the ring is of a width to fit the channel.

20. The construction as in claim 19 in which the ring has side faces in parallel planes.

21. The construction as in claim 19 in which the ring is provided with spaced projections forming shoulders for positioning the sprags thereon.

22. The construction as in claim 18 in which said resilient annulus also forms the energizing means for each of the sprags.

23. The construction as in claim 18 in which the radial dimension of the cross section of said ring in no place exceeds the depth of the channel with which it is engaged.

24. The construction as in claim 18 having a full complement of sprags mounted on said ring with only working clearance therebetween.

References Cited in the file of this patent

UNITED STATES PATENTS

| | | |
|---|---|---|
| 2,407,772 | Dodge | Sept. 17, 1946 |
| 2,486,262 | Davis | Oct. 25, 1949 |
| 2,570,290 | Turner | Oct. 9, 1951 |
| 2,576,337 | Farkas | Nov. 27, 1951 |
| 2,614,669 | Dodge | Oct. 21, 1952 |

FOREIGN PATENTS

| | | |
|---|---|---|
| 298,673 | Great Britain | Oct. 15, 1928 |